Dec. 23, 1924.
A. F. SHORE
1,520,484
SPRING SUPPORT FOR VEHICLES
Filed March 6, 1924
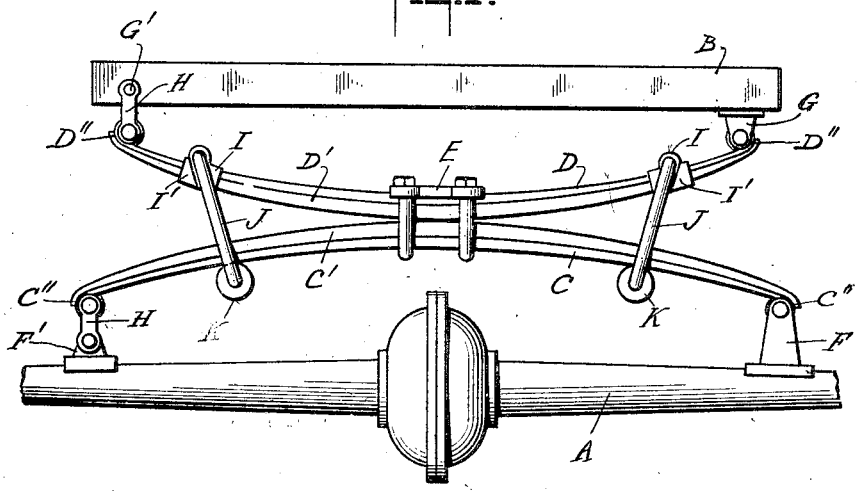
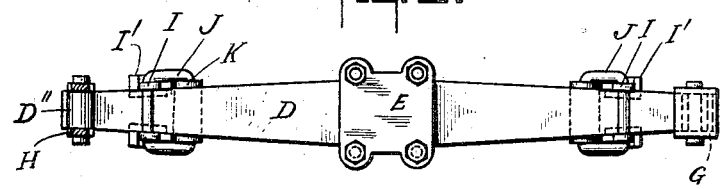
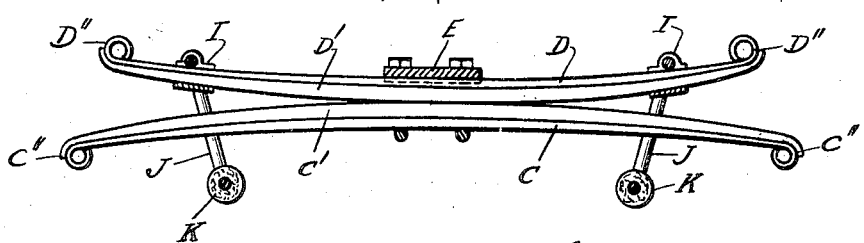
INVENTOR
Albert F. Shore
BY
Geo. A. Hoffman
ATTORNEY Patented Dec. 23, 1924.

1,520,484

UNITED STATES PATENT OFFICE.

ALBERT F. SHORE, OF NEW YORK, N. Y.

SPRING SUPPORT FOR VEHICLES.

Application filed March 6, 1924. Serial No. 697,300.

*To all whom it may concern:*

Be it known that I, ALBERT F. SHORE, a citizen of the United States, residing at 15 West 83rd Street, New York, in the county of New York and State of New York, have invented certain new and useful Improvements in Spring Supports for Vehicles, of which the following is a full, clear, and exact specification.

My invention relates to spring-supports for vehicles, and more particularly to so-called leaf-spring suspension systems for vehicles. Its object is to provide a comparatively simple construction of this character, which will yield a maximum of supporting power and flexure, with a minimum of cross-section or weight.

Another object of the invention is to reduce or limit the amount of rebound.

These and other objects of my invention will more fully appear in the following specification, and pointed out in the appended claims.

According to my invention, the maximum supporting power for a given weight of spring metal is obtained by using comparatively heavy rectangular individual leaves, which gradually taper toward the link extremities both in width and thickness. By the use of this design, a single leaf-spring is quite as elastic and strong as a plurality of thinner leaves. It is, however, desirable to use at least two leaves as a safety factor, in the event of possible breakage.

The increased transverse stroke or flexure I obtain by the use of a thinner spring in the usual limited space, as in a part or full elliptic unit, and by providing two opposed comparatively-flat half or quarter elliptical units, which are fastened together in the center, or at thickest and widest section, and furthest apart or separated at the thinner and narrower extremities.

In the rolling contact assemblies, increased elasticity is obtained by the use of a comparatively-soft spring, which, instead of weakening by the flattening of the curve under the action of overload, will provide an increased length of contact support near the center or point of connection or anchorage, and, therefore, increased strength. This compensation feature allows the use of a spring of comparatively light construction.

The transverse vibrations or shocks are reduced by the comparative softness under light loads and increasing strength under heavy loads, while the undue rebounds are checked by a link fastened to preferably the upper member, which permits full compression but not recoil beyond the position it occupies, as when there is little or no load on the vehicle.

My invention is illustrated in the accompanying drawing, in which—

Figure 1 is a side elevation, showing the opposed half-elliptical form of my new spring construction as applied to the rear axle of a motor-vehicle and extending transversely of the vehicle axis;

Figure 2 is a top or plan view of the leaf-spring shown in Figure 1; and

Figure 3 shows in side elevation the position assumed by the springs when compressed by an abnormal increase in load.

In the construction shown in the drawings, A represents the rear axle of a motor-vehicle, and B a portion of the chassis-frame. Interposed between the parts A and B are two sets of leaf-springs, a lower set and an upper set, each of these sets of springs consisting preferably of a main leaf C or D and an auxiliary leaf C' or D', said auxiliary leaf being of a thickness somewhat greater than the corresponding main leaf, as shown in the drawings. The two sets of springs are arranged with their convex surfaces facing each other, and are connected rigidly approximately at their central portions, where they are held in contact with each other by means of the clamping-plate E. At their ends, the main springs C, D, are provided with eyes C", D", respectively, for connection with the axle A and the frame B. While this connection at one side (shown at the right in the drawings,) is a rigid one, with the exception of a pivotal movement on the fixed bearings F, G, respectively, the connection at the other side (shown at the left in the drawings,) is made by means of links H, interposed between the respective eyes C", D", and the fixed bearings F', G', on the axle and frame, respectively.

To the leaf-springs D, D', I secure rigidly, at a short distance from their ends, bearings I, through which extend links J, embracing the leaf-springs C, C', said links carrying on the lower side of the springs C, C', cushioning rollers K, made of rubber or other soft material. Lugs I' on the bearings I prevent the links J from swinging outwardly too far. It will be seen that the links J with their rollers K, while permitting full compression, will prevent excessive rebounds, after the springs have been compressed under a sudden increase of load, the rollers K not only preventing undue shock, but also objectionable noises, in the event of rebound of the upper structure.

The leaf-springs as shown in the drawings, are made tapering or reduced, from their point of anchorage toward their outer ends, not only in thickness but in width, resulting in the advantages above set forth.

In Figure 3, I have shown the upper and lower springs compressed and in contact with each other for a considerable part of their length from the center outwardly, thus shortening the distance between the point of support and the point of application of the load. To obtain this effect, as shown in the drawings, the relative cross-sections between the center and extremities of the two spring members are so proportioned that the moment of resistance and fiber stress is not absolutely constant, the weakest physical point being at anchorage in the center. This is produced by having the auxiliary leaf so fashioned that it has a constant moment of resistance and fiber stress, while the main leaf does not have a constant fiber stress in the sense that while its width tapers in proportion, its relative thickness with respect to the ends is slightly less or more parallel in the center.

The auxiliary spring-leaf is shown in the drawings as continued beyond the eye-centers of the main leaf and bent upward to conform to the shape of the main leaf at that point.

Various modifications may be made without departing from the nature of my invention, as set forth in the appended claims.

What I claim is:

1. In a spring-support for vehicles, the combination of a main leaf-spring and an auxiliary leaf-spring connected with said main leaf-spring, one of said leaves being so formed that its moment of resistance and fiber stress is constant, while the other leaf is so formed that its moment of resistance and fiber stress is not constant, but is physically weakest at its point of anchorage in the center.

2. In a spring-support for vehicles, a main leaf-spring and an auxiliary leaf-spring connected with said main leaf-spring, said auxiliary leaf-spring being so formed that its moment of resistance and fiber stress is constant, while the main leaf-spring is so formed that its moment of resistance and fiber stress is not constant, but is physically weakest at its point of anchorage in the center.

3. In a spring-support for vehicles, a main leaf-spring and an auxiliary leaf-spring connected with said main leaf-spring, said auxiliary leaf-spring having its central portion somewhat thicker in proportion to its ends than is the case with the main leaf.

4. In a spring-support for vehicles, a main leaf-spring and an auxiliary leaf-spring connected with said main leaf-spring and contacting therewith throughout its length, said auxiliary leaf-spring tapering more in thickness than the main leaf-spring.

5. In a spring support for vehicles, the combination of two leaf-springs, each consisting of two members reduced in both thickness and width from their point of anchorage toward their ends, one of said members having its central portion somewhat thicker in proportion to its ends than is the case with the other member, said springs being connected at their point of largest cross section with their convex sides facing each other, a link secured to one of said springs and embracing the other spring so as to arrest or limit the rebound of the vehicle, and cushioning means interposed between said link and said second named spring.

6. In a spring-support for vehicles, a spring consisting of a main leaf and an auxiliary leaf, each reduced in both thickness and width from its point of anchorage toward the extremities thereof, said auxiliary leaf having its central portion somewhat thicker in proportion to its ends than is the case with the main leaf.

7. In a spring-support for vehicles, a spring consisting of a main leaf and an auxiliary leaf, each leaf tapering from its point of anchorage both in thickness and width, said taper being so proportioned in the main leaf that the fiber stress in said leaf under load is slightly greater near the point of anchorage than toward its ends, and constant in the auxiliary leaf.

8. In a spring-support for vehicles, a spring consisting of two leaves, each having a parallel cross section and each reduced from its point of anchorage toward the load-supporting ends, both in thickness and width, one of said leaves having eyes on its ends, the other leaf having its central portion somewhat thicker in proportion to its ends than is the case with said first leaf, and both of said leaves being arranged on the same longitudinal center line or parallel and both in direct contact with each other throughout their lengths.

9. In a spring-support for vehicles, a spring consisting of a main leaf and an auxiliary leaf, the main leaf having eyes formed on the pressure side of its reduced ends, said leaves being connected together at their point of largest cross-section and each reduced from that point in both width and thickness toward its load-supporting ends, the auxiliary leaf having its central portion thicker in proportion to its ends than is the case with the main leaf, both of said leaves being arranged on the same longitudinal center line or parallel and in direct contact with each other throughout their lengths.

10. In a spring-support for vehicles, two springs, each consisting of two members, said springs being rigidly connected at their center with their convex sides facing and contacting directly with each other, the members of each spring being reduced in both thickness and width from their point of anchorage to their load-supporting ends, one of said members having its central portion somewhat thicker in proportion to its ends than is the case with the other member.

11. In a spring-support for vehicles, the combination of two sets of springs, each consisting of two members, said springs being rigidly connected at their points of greatest cross-section and the members of each spring being reduced in both thickness and width from their points of greatest cross section toward their load-supporting ends, one member being a main leaf having eyes for connection with the vehicle body and the other member being an auxiliary leaf having its central portion somewhat thicker in proportion to its ends than said main leaf.

12. In a spring-support for vehicles, the combination of two sets of springs rigidly connected at their centers and extending transversely of the vehicle, said springs having one end of each fulcrumed on fixed bearings of the frame and axle, respectively, and the other end of each being connected by a link to said frame and axle, respectively, each of said springs consisting of two members reduced in both thickness and width from their point of anchorage toward their load-supporting ends, one of said members having its central portion somewhat thicker in proportion to its ends than the other member, the convex surfaces of said springs being in direct rolling contact with each other to lengthen the surface of contact between the two springs on an increase in the load.

13. In a spring-support for vehicles, a spring consisting of two members, each tapering from its point of anchorage both in thickness and width, one member having its central portion somewhat thicker in proportion to its ends than the other member, the taper of said members being so proportioned that the fiber stress under load is somewhat greater near the point of anchorage than toward its ends.

14. In a spring-support for vehicles, two spring members extending transversely of the vehicle and connected together at their centers and reduced from the point of anchorage toward the load-supporting ends in thickness and width, with their convex surfaces in direct rolling contact with each other to lengthen the surface of contact between the two spring members under an increase in the load, each of said spring members having a main leaf and an auxiliary leaf, the auxiliary leaf having its central portion somewhat thicker in proportion to its ends than is the case with the main leaf.

15. In a spring-support for vehicles, a leaf-spring tapering from its point of anchorage both in thickness and width, said taper being so proportioned that the fibre stress under load is greater near said point of anchorage than toward its ends, said leaf-spring having a main and an auxiliary leaf, which auxiliary leaf extends beyond the centre of the eyes of the main leaf, and a member adapted to cooperate with said leaf-spring when it is put under load.

In testimony whereof I affix my signature.

ALBERT F. SHORE.